Feb. 24, 1953 W. J. STROH ET AL 2,629,769
INTERCARRIER TELEVISION RECEIVER
Filed Dec. 9, 1949
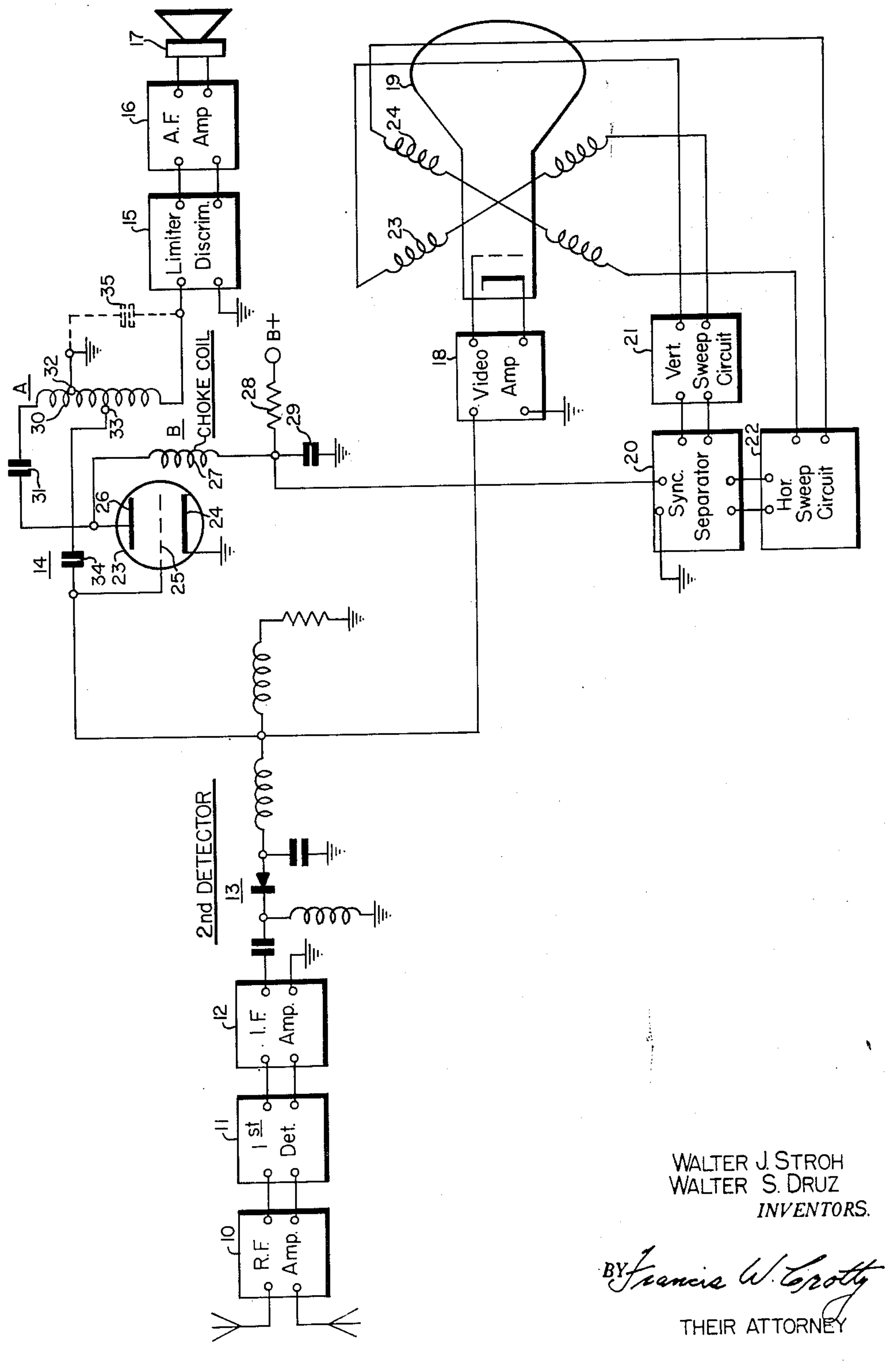
WALTER J. STROH
WALTER S. DRUZ
*INVENTORS.*
BY Francis W. Crotty
THEIR ATTORNEY Patented Feb. 24, 1953 2,629,769

UNITED STATES PATENT OFFICE 2,629,769

INTERCARRIER TELEVISION RECEIVER

Walter J. Stroh, Franklin Park, and Walter S. Druz, Chicago, Ill., assignors to Zenith Radio Corporation, a corporation of Illinois Application December 9, 1949, Serial No. 132,124

4 Claims. (Cl. 178—5.8)

This invention relates to television receivers and more particularly to television receivers of the so-called "inter-carrier sound" type.

Prior to the advent of the inter-carrier sound system, the video-modulated carrier and the sound-modulated carrier components of an incoming television signal were usually separated in the superheterodyne type of television receiver at the output terminals of the first detector stage, prior to the video intermediate-frequency amplifier and the video detector. In such prior receivers, a separate intermediate-frequency amplifier channel is provided for the intermediate-frequency sound signal, and frequency-selective filters are used to separate the video and sound intermediate-frequency carriers and direct them into their respective channels. It is necessary in these receivers to provide a highly stable heterodyning oscillator since frequency drifts of this oscillator may cause incomplete separation of the intermediate-frequency carriers into the two channels, and undesirable interference of one with the other may result.

In an inter-carrier sound receiver, the video and sound intermediate-frequency carriers derived from a received television signal are translated through a common intermediate-frequency amplifier and both are supplied to the video detector. Present-day standards require that a radiated television signal include a first-carrier wave amplitude-modulated with the video components of the television signal and a second-carrier wave frequency-modulated with the sound components thereof and frequency-displaced 4.5 megacycles from the first-carrier wave. Because of this composition of the television signal, the video detector of the receiver of the inter-carrier sound type develops, in addition to the video modulation components, a signal that shall be designated herein as an "inter-carrier signal" having a mean frequency of 4.5 megacycles and frequency-modulated with the sound information of the received television signal. This inter-carrier signal is derived by the heterodyning action in the video detector of the video and sound intermediate-frequency carrier waves, and may be separated from the detected video components of the television signal by means of a network tuned to the mean frequency of the inter-carrier signal. The inter-carrier signal may then be supplied to an appropriate system for producing the sound signal. The inter-carrier sound system has an advantage in that the sound intermediate-frequency channel, necessary in the first-mentioned type of television receiver, is eliminated; and also in that a highly stable heterodyning oscillator is not required since the separation between the video and the sound-signal components of a received television signal is not dependent on the frequency of this oscillator.

Although inter-carrier sound systems are advantageous in that they permit a simplification in the construction of a television receiver, they have heretofore been subject to certain difficulties in effecting adequate separation of the detected composite video signal from the frequency-modulated inter-carrier signal. In particular, it has been found that when high-gain selector networks are employed to select the frequency-modulated inter-carrier signal, there is a strong tendency for the frequency response characteristic of the video channel to be disturbed which permits a portion of the frequency-modulated inter-carrier signal to be accepted by the video channel of the receiver with a corresponding loss in amplitude and power in the inter-carrier signal directed to the sound channel of the receiver.

It is, accordingly, one object of this invention to provide in a television receiver of the inter-carrier sound type an improved circuit for separating the frequency-modulated inter-carrier signal from the composite video signal of a received television signal, this circuit being constructed to provide efficient separation of the inter-carrier signal from the composite video signal without adversely affecting the characteristics of the video channel of the receiver to any appreciable extent.

It has been usual practice in inter-carrier sound systems to separate the frequency-modulated inter-carrier signal from the composite video signal in the video amplifier. The composite video signal includes image-signal components extending through a wide frequency band and also synchronizing-signal components occupying a low-frequency portion of the wide frequency band that is a small fraction thereof. Thus the video amplifier is required to amplify a wide range of frequencies and to obtain an output signal from this amplifier of any appreciable amplitude the discharge devices included therein must be relatively heavily loaded. The heavy loading of the discharge devices in the video amplifier results in their being driven into the non-linear range of their characteristics by the high-amplitude synchronizing-signal components of the composite video signal. This, in turn, gives rise to a downward modulation of the inter-carrier signal which causes an undesirable "buzz" in the audio signal reproduced by the sound reproducing device of the receiver. This effect is particularly objectionable when the contrast control of the receiver is adjusted to increase the contrast of the reproduced image, since such an adjustment acts to increase the loading of the video amplifier.

To overcome the above-mentioned undesirable condition that arises when the inter-carrier signal is separated from the video signal in the video amplifier of a television receiver, inter-carrier sound systems have been devised which include an additional amplifier, interposed between the video detector and sound channel of the receiver. This additional amplifier functions to separate the inter-carrier signal from the composite video signal, and includes a frequency-selective output circuit, tuned to the mean frequency of the inter-carrier signal, for supplying the inter-carrier signal to the sound channel of the receiver. In this latter type of inter-carrier sound system, the video amplifier and synchronizing separator stages are coupled to the video detector of the receiver in usual fashion. Since the afore-mentioned additional amplifier is not utilized to translate the wide-band composite video signal, it need not be heavily loaded, and the synchronizing-signal components of the composite video signal do not drive the device into the non-linear portion of its characteristic. Therefore, the downward modulation of the inter-carrier signal is materially reduced.

The present invention provides an additional amplifier, disposed between the video detector and sound channel of an inter-carrier sound television receiver, to separate the frequency-modulated inter-carrier signal from the composite video signal of the received television signal and to supply the inter-carrier signal to the sound channel. This additional amplifier also translates only those low-frequency components of the composite video signal (for example from 0–0.75 megacycle) which contain the synchronizing-signal components of the video signal. These low-frequency components are applied to the synchronizing-signal separator of the receiver.

Therefore, by use of the above system, the signal applied to the synchronizing-signal separator is derived from the additional amplifier, and not from the video channel of the receiver. Thus, the intensity of the signal applied to the synchronizing-signal separator is independent of contrast adjustments, and synchronization is maintained with the received television signal for any setting of the contrast control of the receiver. Moreover, since it is required that the additional amplifier translate the inter-carrier signal and only a small portion of the frequency components of the composite video signal, it need not be heavily loaded, and the previously described downward modulation of the inter-carrier signal by the video signal is materially reduced.

It is, accordingly, a further object of this invention to provide in a television receiver of the inter-carrier sound type an improved circuit for separating the frequency-modulated inter-carrier signal from the composite video-signal portion of a received television signal and to supply the inter-carrier signal to the sound channel of the receiver, this circuit being so constructed that undesirable modulation of the inter-carrier signal by the composite video signal is eliminated, regardless of contrast adjustments of the receiver.

Yet another object of this invention is to provide such an improved circuit for supplying the inter-carrier signal to the sound channel of the receiver, which circuit is constructed also to translate only those low-frequency components of the composite video signal containing the synchronizing components of this signal and to supply these low-frequency components to a synchronizing-signal separator stage of the receiver with an intensity unaffected by contrast adjustment of the receiver.

The features of this invention which are believed to be new are set forth with particularity in the appended claims. The invention itself, however, together with further objects and advantages thereof may best be understood by reference to the following description when taken in conjunction with the accompanying drawing, in which the single figure shows an inter-carrier sound television receiver constructed in accordance with a preferred embodiment of the invention.

Referring now to the single figure, the television receiver illustrated therein includes a radio-frequency amplifier 10 of one or more stages, a first detector 11, an intermediate-frequency amplifier 12 of any desired number of stages and a video detector 13, all of known design and connected in well-known manner. The input terminals of the radio-frequency amplifier 10 may be coupled to any suitable antenna circuit. The second detector 13 is coupled to an amplifier circuit which embodies the present invention and which is indicated generally as 14. The circuit 14 is connected to a limiter-discriminator 15 which, in turn, is connected to an audio amplifier 16, the stages 15 and 16 constituting the sound channel of the receiver and being constructed in any well-known manner. The output terminals of the audio amplifier 16 are connected to a sound-reproducing device 17.

The video detector 13 is also connected to a video amplifier 18 of any desired number of stages, and the output terminals of the amplifier 18 are connected to the control electrode and cathode of an image reproducing device 19. The video amplifier 18 may include a well-known contrast control to control the gain of this amplifier and, thus, the contrast of the image reproduced by device 19.

The circuit 14 is also connected to a synchronizing-signal separator 20 of any known type, and the output terminals of the separator 20 are connected to a vertical-sweep circuit 21 and horizontal-sweep circuit 22 to synchronize the operation of these circuits with the synchronizing-signal components of a received television signal. The output terminals of the vertical-sweep circuit 21 and horizontal-sweep circuit 22 are connected respectively to the vertical and horizontal deflection elements 23, 24 of the reproducing device 19 to control the sweep of the cathode-ray in this device.

The operation of the television receiver thus far described is as follows: A television signal intercepted by the antenna circuit is amplified in the radio-frequency amplifier 10 and heterodyned to the selected intermediate frequency of the receiver in the first detector 11. The intermediate-frequency signal from the first detector 11 is amplified in the intermediate-frequency amplifier 12 and detected in the video detector 13. As previously pointed out, the video detector 13 in addition to producing a detected composite video signal also produces an inter-carrier signal frequency-modulated with the sound components of the received television signal.

The frequency of the inter-carrier signal is established at 4.5 megacycles in accordance with present-day standards. The frequency range of the image signal components of the composite video signal produced by the detector 13 extends over a band of 0–4.5 megacycles. The video amplifier 18 is preferably constructed to translate efficiently signal frequencies up to 3.5 megacycles and to be substantially unresponsive to signal frequencies in the vicinity of 4.5 megacycles which correspond to the frequency of the inter-carrier signal developed in detector 13. Therefore, substantially all of the image-signal components of the detected composite video signal are amplified thereby and applied to the control electrode of image-reproducing device 19 to the exclusion of the 4.5 megacycles inter-carrier signal.

The video signal and inter-carrier signal produced by the detector 13 are supplied to the amplifier circuit 14, and this circuit acts to supply the frequency-modulated inter-carrier signal to the limiter-discriminator 15 wherein an audio signal is produced representing the sound intelligence of the received television signal. The audio signal from stage 15 is amplified in audio amplifier 16 and the sound intelligence is reproduced by the sound-reproducing device 17.

The lower frequency components of the composite video signal which include the synchronizing-signal components are supplied to the synchronizing-signal separator 20 by the amplifier circuit 14. The synchronizing-signal separator 20 acts in well-known manner to remove the synchronizing-signal components from the signal applied to its input terminals and to apply these synchronizing-signal components to the sweep circuits 21, 22 to synchronize these circuits with the received television signal.

In this manner, the sound intelligence of the received television signal is reproduced by the sound-reproducing device 17, the composite video signal of the received television signal controls the intensity of the cathode-ray in image-reproducing device 19, and the synchronizing-signal components of the composite video signal act to synchronize the sweep of the cathode-ray in this device. Therefore, the video and sound intelligence of the received television signal are reproduced by the receiver illustrated in the drawing.

The circuit 14 includes an electron-discharge device 23 which, for purposes of economy, may be a simple triode. The cathode 24 of device 23 is connected to ground, and the control electrode 25 of this device is connected to the output circuit of the second detector 13. The anode 26 of device 23 is connected to the positive terminal B+ of a source of unidirectional potential through a choke coil 27 and load resistor 28. The common junction of these last-mentioned elements is by-passed to ground by means of a capacitor 29, and is connected to one of the input terminals of synchronizing-signal separator 20, the other input terminal being connected to ground.

The anode 26 is further coupled to one extremity A of an auto-transformer 30 through a blocking capacitor 31. The other extremity B of transformer 30 is connected to one input terminal of the limiter discriminator 15, the other input terminal of this stage being grounded. A tap 32 on transformer 30 is connected to ground, the portion A–32 of the transformer defining the primary winding and the portion 32–B defining the secondary winding thereof. A further tap 33 on the winding 30 is coupled to the control electrode 25 through a neutralizing capacitor 34, the portion of the winding 30 defined between the taps 33 and 32 preferably being equal to the portion thereof defined between the tap 32 and the extremity A, for reasons to be described. The input capacity of the limiter-discriminator 15 is shown dotted and acts in conjunction with the secondary winding of transformer 30 to form a tuned network resonant at the mean frequency of the inter-carrier signal.

The detected video signal and the frequency-modulated inter-carrier signal produced by the video detector 13 are applied to the control electrode 25 of device 23. The choke coil 27 is constructed to pass only the low-frequency components of the composite video signal, for example, signal frequencies from 0 to 0.75 megacycle. The capacitor 29 is selected to function as a by-pass for signal frequencies greater than 0.75 megacycle. Therefore, the 4.5 megacycle inter-carrier signal and the higher frequency components of the video signal do not appear across the load resistor 28, while the lower frequency components of the video signal which include the synchronizing-signal components do appear across this resistor and are impressed on the synchronizing-signal separator 20. It can be seen that since the signal applied to the synchronizing-signal separator 20 is not derived from video channel of the receiver, contrast adjustments made to the video channel have no effect on the intensity of this signal.

Since, in addition to the inter-carrier signal, the amplifier 14 is required to translate only those frequency components of the composite video signal in a frequency range that is a small fraction of the total frequency range of the video signal components, the discharge device 23 need not be heavily loaded, and as previously described, downward modulation of the inter-carrier signal by the video signal is materially reduced.

The inter-carrier signal is derived from the circuit 14 by means of an auto-transformer network 30. As previously pointed out, the secondary winding of the transformer may be tuned to be resonant at the mean frequency of the inter carrier signal by the distributed input capacity of stage 15, this capacity being indicated by the capacitor 35. The inter-carrier signal is developed in the tuned network of the secondary winding and capacitance 35, and this signal is impressed thereby across the input terminals of stage 15. As previously pointed out, the frequency-modulated inter-carrier signal is amplitude-limited and detected in the stage 15, and the resulting audio signal is amplified in the amplifier 16 and supplied to the sound-reproducing device 17.

It is desirable from an economy standpoint to utilize a triode as the device 23 in the amplifier circuit 14. However, the circuit coupling this device to the sound channel of the receiver includes the network 30, 35 which is tuned to resonate at the frequency of the inter-carrier signal. Therefore, at this resonant frequency the network acts as a resistive impedance and the amplified inter-carrier signal appearing at the anode 26 is reversed in phase with respect to the inter-carrier signal applied to control electrode 25. This condition causes a relatively high reactive current flow through the capacitance formed by the control electrode 25 and anode 26, and gives rise to the well-known "Miller effect." The Miller effect acts to alter the input circuit characteristic of the device in a manner similar to the effect of a relatively large capacitor connected between the control electrode 25 and ground.

To neutralize this Miller effect, the tap 33 on coil 30 is coupled to the control electrode 25 through a neutralizing capacitor 34. As previously stated, tape 33 is disposed on the opposite side of ground tap 32 from the extremity A and defines an equal number of turns. Therefore, the tap 33 is established at an equal and opposite potential with respect to ground to that of extremity A, and supplies a current to the input circuit of device 23 of the proper amplitude and phase to neutralize the afore-mentioned reactive current. Thus, the attenuation of the inter-carrier signal due to Miller effect that occurs when an un-neutralized simple triode is utilized as device 23 is eliminated.

This invention provides, therefore, an improved television receiver circuit for separating the inter-carrier signal from the composite video signal of a received television signal, by means of which the adverse effect on the characteristic of the video channel of the receiver, previously produced by such circuits, is obviated.

This invention further provides such an improved separating circuit by means of which undesirable modulation of the inter-carrier signal by the video signal of the received television signal is eliminated for all practical purposes. Moreover, this invention provides such an improved separating circuit which also functions to supply a portion of the received television signal containing the synchronizing-signal components to the synchronizing-signal separator of the receiver with an intensity inaffected by contrast adjustments of the receiver.

While a particular embodiment of the invention has been shown and described modifications may be made and it is intended in the appended claims to cover all such modifications as fall within the true spirit and scope of the invention.

We claim:

1. In a receiver for utilizing a television signal including a composite video signal amplitude-modulated on a first carrier wave, and a sound signal frequency-modulated on a second carrier wave frequency-displaced a predetermined amount from said first carrier wave. said composite video signal including image-signal components contained within a given frequency band and further including synchronizing-signal components contained within a small portion of said band: a detector circuit for detecting said amplitude-modulated composite video signal, and for heterodyning said first and second carrier waves to produce an inter-carrier signal frequency-modulated with said sound signal; a video channel coupled to said detector circuit and having an acceptance band corresponding to said given frequency band for utilizing said detected composite video signal; an electron-discharge device separate from said video channel; an input circuit for said device coupled to said detector circuit for supplying said detected composite video signal and said frequency-modulated inter-carrier signal to said device; a synchronizing channel; a first output circuit for said device including a filter network having a pass-band corresponding to said small portion of said given frequency band for supplying substantially only said synchronizing components to said synchronizing channel; a sound channel; and a second output circuit for said device for supplying said inter-carrier signal to said sound channel and including a network tuned to be resonant at the mean frequency of said inter-carrier signal.

2. In a receiver for utilizing a television signal including a composite video signal amplitude-modulated on a first carrier wave, and a sound signal frequency-modulated on a second carrier wave frequency-displaced a predetermined amount from said first carrier wave, said composite video signal including image-signal components contained within a given frequency band and further including synchronizing-signal components contained within a small portion of said band: a detector circuit for detecting said amplitude-modulated composite video signal, and for heterodyning said first and second carrier waves to produce an inter-carrier signal frequency-modulated with said sound signal; a video channel coupled to said detector circuit and having an acceptance band corresponding to said given frequency band for utilizing said detected composite video signal; an electron-discharge device separate from said video channel; an input circuit for said device coupled to said detector circuit for supplying said detected composite video signal and said frequency-modulated inter-carrier signal to said device; a synchronizing channel; a first output circuit for said device for supplying said synchronizing components to said synchronizing channel including a load resistor coupled to said synchronizing channel, a series-connected choke-coil having a low impedance to signals within said small portion of said given frequency band, and a capacitor by-passing said load resistor for signals outside of said portion of said frequency band; a sound channel; and a second output circuit for supplying said inter-carrier signal to said sound channel and including a network tuned to be resonant at the mean frequency of said inter-carrier signal.

3. In a receiver for utilizing a television signal including a composite video signal amplitude-modulated on a first carrier wave, and a sound signal frequency-modulated on a second carrier wave frequency-displaced a predetermined amount from said first carrier wave, said composite video signal including image-signal components contained within a given frequency band and further including synchronizing-signal components contained within a small portion of said band: a detector circuit for detecting said amplitude-modulated composite video signal, and for heterodyning said first and second carrier waves to produce an inter-carrier signal frequency-modulated with said sound signal; a video channel coupled to said detector circuit and having an acceptance band corresponding to said given frequency band for utilizing said detected composite video signal; an electron-discharge device separate from said video channel; an input circuit for said device coupled to said detector circuit for supplying said detected composite video signal and said frequency-modulated inter-carrier signal to said device; a synchronizing channel; a first output circuit for said device including a filter network having a passband corresponding to said portion of said given frequency band for supplying substantially only said synchronizing components to said synchronizing channel; a sound channel; and a second output circuit for said device for supplying said inter-carrier signal to said sound channel and including, an inductance coil having first and second extremities connected respectively to said device and to said sound channel and having a preselected tap thereon connected to a point of reference potential, the portion of said coil defined by said tap and said second extremity being tuned to be resonant at the mean frequency of said inter-carrier signal.

4. In a receiver for utilizing a television signal including a composite video signal amplitude-modulated on a first carrier wave, and a sound signal frequency-modulated on a second carrier wave frequency-displaced 4.5 megacycles from said first carrier wave, said composite video signal including image-signal components contained within a frequency band extending from 0 to 4.5 megacycles and further including synchronizing-signal components contained with a frequency band extending from 0 to 0.75 megacycle: a detector circuit for detecting said amplitude-modulated composite video signal, and for heterodyning said first and second carrier waves to produce an inter-carrier signal frequency-modulated with said sound signal and having a mean frequency of 4.5 megacycles; a video channel coupled to said detector circuit and having an acceptance band extending from 0 to 3.5 megacycles for utilizing substantially all of said image-signal components of said detected composite video signal; an electron-discharge device separate from said video channel; an input circuit for said device coupled to said detector circuit for supplying said detected composite video signal and said frequency-modulated inter-carrier signal to said device; a synchronizing channel; a first output circuit for said device including a low-pass filter having a pass-band extending to 0.75 megacycle for supplying substantially only said synchronizing components to said synchronizing channel; a sound channel; and a second output circuit for said device for supplying said inter-carrier signal to said sound channel and including a network tuned to be resonant at the mean frequency of said inter-carrier signal.

WALTER J. STROH.
WALTER S. DRUZ.

REFERENCES CITED

The following references are of record in the file of this patent:

UNITED STATES PATENTS

| Number | Name | Date |
|---|---|---|
| 2,458,365 | Fyler | Jan. 4, 1949 |
| 2,498,488 | Fyler | Feb. 21, 1950 |
| 2,504,662 | Dome | Apr. 18, 1950 |